US008410759B2

(12) United States Patent
Zinck et al.

(10) Patent No.: US 8,410,759 B2
(45) Date of Patent: Apr. 2, 2013

(54) ELECTROLYTE FOR AN ELECTROCHEMICAL BATTERY CELL

(75) Inventors: Laurent Zinck, Mothern (FR);
Guenther Hambitzer, Pfinztal (DE);
Joachim Heitbaum, Bonn (DE);
Christiane Ripp, Pfinztal (DE)

(73) Assignee: Fortu Intellectual Property AG, Sarnen (CH)

( * ) Notice: Subject to any disclaimer, the term of this patent is extended or adjusted under 35 U.S.C. 154(b) by 313 days.

(21) Appl. No.: 12/745,967

(22) PCT Filed: Dec. 12, 2008

(86) PCT No.: PCT/EP2008/010613
§ 371 (c)(1),
(2), (4) Date: Jun. 3, 2010

(87) PCT Pub. No.: WO2009/077140
PCT Pub. Date: Jun. 25, 2009

(65) Prior Publication Data
US 2010/0259224 A1    Oct. 14, 2010

(30) Foreign Application Priority Data

Dec. 14, 2007    (EP) .................................... 07024275

(51) Int. Cl.
*H02J 7/00*    (2006.01)
*H01M 6/04*    (2006.01)

(52) U.S. Cl. ........................................ 320/137; 429/346

(58) Field of Classification Search .................. 320/137; 429/346
See application file for complete search history.

(56) References Cited

U.S. PATENT DOCUMENTS

| 6,709,789 | B1 | 3/2004 | Hambitzer et al. |
| 6,730,441 | B1 | 5/2004 | Hambitzer et al. |
| 7,244,530 | B2 * | 7/2007 | Hambitzer et al. ........... 429/245 |
| 2005/0106467 | A1 | 5/2005 | Hambitzer et al. |
| 2006/0124973 | A1 * | 6/2006 | Arai et al. .................... 257/223 |
| 2007/0065714 | A1 | 3/2007 | Hambitzer et al. |

FOREIGN PATENT DOCUMENTS

| GB | 2 124 821 A | 2/1984 |
| JP | 2000-17076 A | 1/2000 |
| WO | 02/071507 A2 | 9/2002 |

OTHER PUBLICATIONS

Foster et al., "New Highly Conductive Inorganic Electrolytes", Journal of the Electrochemical Society, 135 (Nov. 1988), No. 11, pp. 2602-2606.
Stephan, "Review on gel polymer electrolytes for lithium batteries", European Polymer Journal, 42 (2006), pp. 21-42.

* cited by examiner

*Primary Examiner* — M'Baye Diao
(74) *Attorney, Agent, or Firm* — Rothwell, Figg, Ernst & Manbeck, P.C.

(57) ABSTRACT

Electrolyte for an electrochemical battery cell that contains sulphur dioxide and a conductive salt. The electrolyte is a gel that is formed with to the involvement of a fluorosulphinate. The invention is also directed to a battery cell that contains such an electrolyte.

13 Claims, 3 Drawing Sheets

ELECTROLYTE FOR AN ELECTROCHEMICAL BATTERY CELL

CROSS REFERENCE TO RELATED APPLICATION

Figure 1:
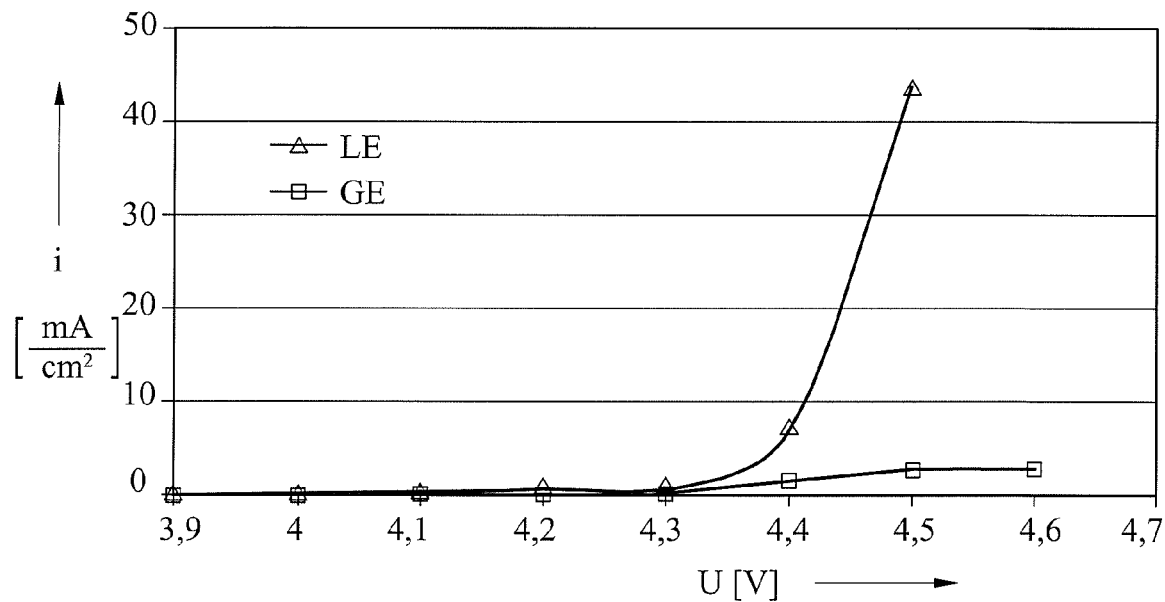

This application is a 35 U.S.C. 371 National Phase Entry Application from PCT/EP2008/010613, filed Dec. 12, 2008, which claims the benefit of European Patent Application No. 07024275.5 filed on Dec. 14, 2007, the disclosures of which are incorporated herein in their entirety by reference.

The invention concerns electrochemical battery cells, in particular rechargeable, non-aqueous cells. Such cells, and batteries created from one or more such cells, are required for a wide range of applications. The development objectives for new battery cells are in particular to obtain high energy density, high current carrying capacity (low internal resistance), long service life throughout many charging and discharging cycles, low costs, and a high level of operational safety.

One important functional element is the electrolyte, which is in contact with the positive and negative electrodes of battery cells. The electrolyte contains a conductive salt. At least one ion of the conductive salt (the anion or the cation) is movable in the electrolyte in the sense that the transport of the charge between the electrodes, which is essential for the function of the cell, can take place due to ionic conduction.

The invention relates in particular to $SO_2$-based electrolytes. "$SO_2$-based electrolyte" designates an electrolyte that contains $SO_2$ not just in low concentration as an additive, but in which the $SO_2$ at least to some degree enables the mobility of the ions of the conductive salt contained in the electrolyte, thus ensuring the charge transport.

Such an electrolyte is preferably used in an alkali metal cell in which the active metal (whose state of oxidation changes when the cell is charged and discharged, due to the reaction taking place at the negative electrode) is an alkali metal, lithium being preferred. However, the active metal may also be an alkaline earth metal from the second subgroup of the periodic system. For exemplary purposes (but without limiting the generality), lithium will hereafter be referred to primarily as the active metal of the negative electrode.

In the case of an alkali metal cell, a tetrahalogen aluminate of the alkali metal, for example $LiAlCl_4$, is preferably used as the conductive salt. An alkali metal cell with an $SO_2$-based electrolyte will be designated hereafter as an alkali metal $SO_2$ cell. Other preferred conductive salts are aluminates, halides, oxalates, borates, phosphates, arsenates, and gallates of an alkali metal, in particular of lithium.

The electrolyte solution used for battery cells is usually in the liquid form. For example, a sulphur dioxide-based electrolyte having a sulphur dioxide content of at least about 0.5 mol $SO_2$ per mol conductive salt is liquid at room temperature. One of the main advantages of liquid electrolytes is that they conduct ions very readily, because the ions are able to move more easily in the liquid. The cells have a low internal resistance and may be operated with high charging and discharging currents.

However, use of a liquid electrolyte has not only advantages, but also drawbacks. These relate in particular to the safety of the battery cells. If the housing starts to leak due to damage or improper handling during operation, a liquid electrolyte escapes immediately, and volatile components, such as sulphur dioxide, evaporate. The escaping electrolyte can cause considerable inconvenience or even hazards. For example, escaping $SO_2$ is perceived as a substance having an unpleasant odor. At least in the case of an alkali metal cell, the liquid electrolyte solution reacts violently upon contact with water. Besides the formation of dense white clouds, the reacting components of the electrolyte may also spatter, thereby leading to irritating skin inflammations.

A further disadvantage of liquid electrolyte solutions is the complicated arrangements required to prevent short circuits between the inner connectors of the cell, these connectors providing the electrical connection between the outer cell contacts and the electrodes inside the cell. The cells must generally be capable of functioning regardless of their position, that is to say they must be unaffected by their orientation in space. If there is electrolyte between the inner connectors of the cell, larger amounts of a metal such as lithium may be deposited in this area because the electrical resistance is lower there than elsewhere in the cell. As a result, the metal forms a deposit on one of the conductors, and ultimately causes a short circuit if it touches the other conductor. Sophisticated insulation measures are required to prevent this.

For these and other reasons, many attempts have been made to eliminate the risks and drawbacks associated with a liquid electrolyte. In particular in the area of organic electrolytes, such as are used in lithium-ion batteries, many variations of polymer electrolytes have been suggested. While they provide advantages in terms of safety, they still have significant disadvantages in other respects, in particular in terms of electrical resistance, and thus also the electrical power of the cell. The relatively best properties in this regard may be obtained with "gel polymer electrolytes". A summary of this development is provided in the publication by A. M. Stephan, "Review on gel polymer electrolytes for lithium batteries", European Polymer Journal 42 (2006), 21-42.

The present invention is primarily directed to inorganic electrolytes. These preferably do not contain any carbon atoms. However, the invention may also be used with electrolytes that contain organic components, such as acetonitrile.

For inorganic electrolytes, it is suggested, for example in EP 1 149 429, to place a solid-phase salt in a porous structure close to the negative electrode of the cell in such a manner that it comes into contact with the active material that is deposited at the negative electrode. The intended improvement in safety is explained both by chemical effects of the salt additive and physical effects associated among other factors with the reduced mobility in the area of the solid salt. According to WO 02/071507, it is suggested to use an additive of inorganic solid particles to increase the viscosity in the case of a sulphur dioxide-based electrolyte. In WO2003/061036, it is suggested to use a porous structure in the cell, preferably consisting of at least two fractions of solid particles having different average particle sizes. Although these suggestions are suitable for increasing the safety of electrochemical battery cells and ensuring good functional characteristics, there is still a need for a technical solution that retains the advantages of a liquid electrolyte as far as possible, in particular in respect of the cell's low internal resistance, yet minimizes safety hazards.

In this context, the invention addresses the technical problem of providing an electrolyte for an electrochemical battery cell, and a battery cell containing such an electrolyte that combines as optimally as possible the properties of high permissible current densities and high operational safety, even though these properties are to some degree mutually contradictory.

This object is solved by an electrolyte according to claim 1. Preferred embodiments are described in the subclaims. The invention is further directed to a battery cell that contains such an electrolyte. In the claims, the word "a" is to be construed as the indefinite article, not as an indicator of singularity.

Accordingly, more than one of the corresponding elements of the claims may be present in any embodiment of the invention.

The electrolyte according to the invention contains sulphur dioxide. The proportion of $SO_2$ relative to the conductive salt is preferably at least 0.5 mol $SO_2$ per mol conductive salt, and especially at least 0.1 mol $SO_2$ per mol conductive salt. When the concentration of $SO_2$ was too low, an increase in the specific resistance of the electrolyte was observed. The electrolyte is a gel that is formed with the participation of a fluorosulphinate. For this purpose, a fluorosulphinate is understood to be a salt from an $[SO_2F]^-$ anion and any cation.

A gel is usually understood to be a disperse system consisting of at least two components, in which one of the components is a solid, colloidally dispersed substance, which is often designated as a thickening agent, or also a gelling agent. Hereafter, the designation "gelling agent" will be used. The gelling agent forms a spatial network in the gel, wherein the particles thereof are linked to each other at certain points (for example by Van der Waals forces, ionic bridges, $SO_2$ bridges). The second component is located in the interstitial spaces of the network.

In the context of the invention, it has been found that a gel electrolyte having highly advantageous properties may be produced if a salt with a fluorosulphinate anion is involved in the gel-forming reaction. This finding is based on the experimental observation that the electrolyte system $LiAlCl_4 \cdot xSO_2$ ($SO_2$-based electrolyte with lithium tetrachloroaluminate as conductive salt) forms a gel when a suitable fluoride is added. Further experiments revealed that the fluoride reacts with the $SO_2$ in the electrolyte to form a salt, the anion of which is $[SO_2]^-$. If the cation in the fluoride is designated Me, the reaction for forming the fluorosulphinate may be written as follows:

$$MeF_y + SO_2 \rightarrow Me(SO_2F)_y \qquad (I)$$

For the subsequent gel formation, the following mechanism is suggested on the basis of the current state of the inventors' knowledge, which has not yet been fully confirmed. It is explained hereafter for exemplary purposes with reference to a monovalent metal cation $Me^+$:

Reaction of the fluorosulphinate with the conductive salt tetrachloroaluminate. This forms the Lewis-acid aluminium chloride, which reacts with the fluorosulphinate in a Lewis-acid/Lewis-base reaction. This results in the formation of a metal complex and solid LiCl. Precipitation of solid LiCl may be inhibited or entirely prevented if a metal halide MX is added to the electrolyte solution beforehand, wherein M is a metal from the third main group of the periodic system and X is one of the halogens fluorine, chlorine, bromine, or iodine:

$$LiAlCl_4 + MeSO_2F \rightarrow LiCl + Me^+[SO_2FAlCl_3]^- \qquad (II)$$

Binding of complex ions by the sulphur dioxide of the electrolyte solution and formation of a network-like structure:

$$Me^+[SO_2FAlCl_3]^- + LiAlCl_4 \cdot xSO_2 \rightarrow \text{network-like structure} \qquad (III)$$

Figure 6:
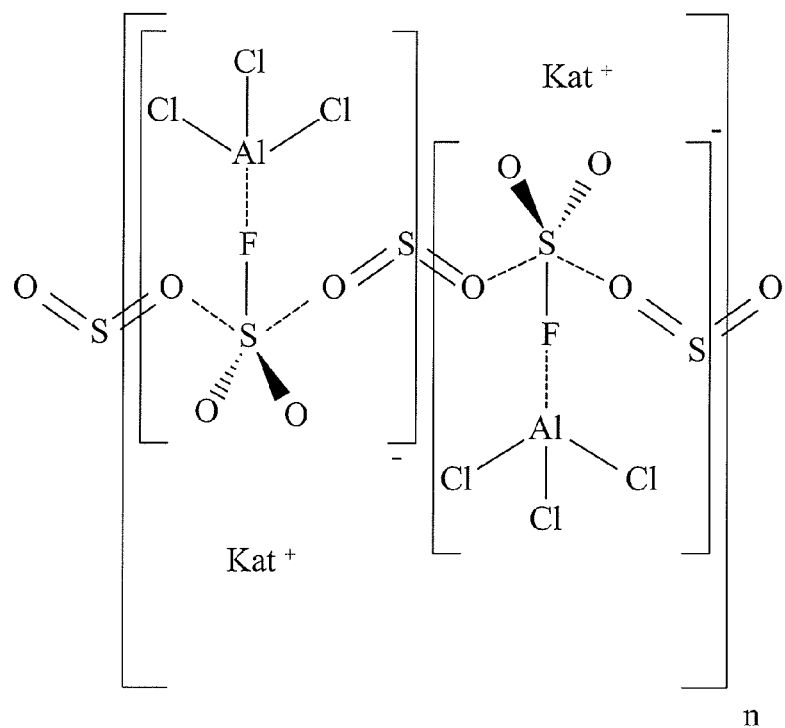

A network-like structure of the gel-phase electrolyte that is probable according to the current state of the inventors' knowledge is shown graphically in FIG. 6.

In general a fluoride having a cation that matches the cation of the conductive salt (which is also the active metal of the cell), thus in the case of a lithium cell $Li^+$, is in particular suitable for gel formation. From the literature (F. Seel, L. Riehl "Über Fluorsulfinate", Z. Anorg. Allgem. Chem. 282, 293 (1955)), it is known that fluorosulphinates may be prepared from alkali metals by reacting alkali fluorides with liquid or gaseous $SO_2$. However, the primary addition reaction for forming the sulphinate does not take place with all fluorides. It has been observed with NaF, KF, RbF and CsF, and the rate of conversion becomes faster in this sequence (that is to say as the size of the cation increases). In general, the reaction is very slow, and may take several weeks. In the most favourable case, it lasts a few days.

According to the literature, no addition reaction forming the corresponding sulphonates takes place with LiF and $CaF_2$. However, it was observed in the context of the invention that also with LiF a sulphinate and subsequently a gel may be formed if additional steps are taken. In particular, the slow reaction may be speeded up by suitable methods, for example stirring or the application of ultrasound. The presence of small quantities of a larger cation than the Li cation, for example potassium ions $K^+$, may also accelerate gel formation. This effect is based on the fact the KF is more readily soluble in the electrolyte solution than LiF.

In this respect the following reaction mechanism is suggested:

Reaction of potassium ions with lithium fluoride (ion exchange):

$$K^+ + LiF \rightarrow KF + Li^+ \qquad (Ia)$$

Reaction of potassium fluoride with the sulphur dioxide of the electrolyte solution, yielding potassium fluorosulphinate:

$$KF + SO_2 \rightarrow KSO_2F \qquad (I)$$

Complex-forming reaction analogous to the preceding equation (II):

$$LiAlCl_4 + KSO_2F \rightarrow LiCl + K^+[SO_2FAlCl_3]^- \qquad (II)$$

Ion exchange reaction of the complex cations:

$$K^+[SO_2FAlCl_3]^- + Li^+ \rightarrow Li^+[SO_2FAlCl_3]^- + K^+ \qquad (IIa)$$

The potassium ion formed thereby is in turn available for use in reaction (Ia). The circular process explains the accelerating effect of very small quantities of a potassium additive.

Structure formation analogous to the preceding equation (III):

$$Li^+[SO_2FAlCl_3]^- + LiAlCl_4 \cdot xSO_2 \rightarrow \text{network-like structure} \qquad (III)$$

The decisive reactant of the described gel-forming processes is the fluorosulphinate anion. This may be formed by a reaction with a suitable fluoride according to reaction equation (I), supra. This reaction may take place either inside a battery cell or outside the cell, depending on the method used for manufacturing the cell (as described in greater detail further below).

Various fluorides are suitable for producing the fluorosulphinate anion. These include alkali or alkaline earth fluorides, such as CsF, RbF, $SrF_2$ or $BaF_2$. Metal fluorides, in particular transition metal fluorides having small cations (for transition metals), such as $MnF_3$, may be used. As was explained previously, LiF and $CaF_2$ do not combine with $SO_2$ to form sulphonates without additional steps, and thus also do not spontaneously result in gel formation. However, they may be used if additional measures are taken to promote gel formation, in particular the addition of larger cations, in a quantity sufficient for a catalytic effect, and/or the application of mechanical energy (for example by stirring or ultrasonic treatment) for a long period of time. The suitability of individual flourides may be determined experimentally, wherein the following properties are important with respect to the salt used for forming the fluorosulphinate anion:

The metal fluoride should react with $SO_2$ (in its pure form or from the electrolyte).

The cation of the fluoride must not impair the cell function, in particular the electrochemical reactions that take place in the cell.

As was stated earlier, the mechanisms designated (II) and (III) above for forming the network-like gel structure have not yet been fully verified. However, it may be assumed that in the gel the $SO_2$ belongs to the gel-forming structure. For example, based on the structure shown in FIG. 6, a part of the original amount of $SO_2$ is bound in the fluorosulphinate. Another part is still present in the form of an $SO_2$ molecule, but it is fixed immovably in the structure (in the case shown, in the form of $SO_2$ bridges between complexes). Nevertheless, in the gel the $SO_2$ still assures the mobility (at least in part) of the ions of the conductive salt (in the sense of the above definition of an $SO_2$-based electrolyte), because the solvation energy enabling the conductive salt to dissociate in the electrolyte is provided by the $SO_2$. In this sense, the $SO_2$ functions as a solvent for the conductive salt, even though it is present in the gel mainly in bound and/or fixed form.

The gel-like electrolyte according to the invention is distinguished by many advantageous properties:

The electrical properties are equal to those in a sulphur dioxide-based electrolyte that has not been transformed into a gel. For example, an electrolyte solution with the composition $LiAlCl_4*1,4\ SO_2$ has an electrical conductivity at room temperature of 50 mS cm$^{-1}$, and this is not altered when a gel is formed.

The vapour pressure of an electrolyte solution with the said composition is about $0.1*10^5$ Pa at 20° C. If a gel is formed therefrom, the vapour pressure is reduced further.

The reaction to produce the fluorosulphonate from $SO_2$ has the effect of reducing the concentration of $SO_2$ in the electrolyte solution. This improves the safety of the cell, but the reduced concentration of unbound $SO_2$ (which is advantageous for safety purposes) does not impair the electrical properties.

The gel has thixotropic properties, i.e. it becomes flowable again when stirred. This is advantageous for processing during the production of battery cells.

Since most of the sulphur dioxide in the electrolyte according to the invention is present in bound and/or fixed form, there is only very little transport of $SO_2$ together with the transporting of the ions of the active metal. As a result, no sulphur dioxide concentration gradient is formed in the cell due to the ion current transported therein. Instead, the bound and fixed $SO_2$ remains evenly distributed in the cell.

It was observed that overcharging reactions are reduced. This is attributed to the fact that at higher potentials the gel-forming anion or a complex containing the gel-forming anion is adsorbed on the surface of the positive electrode. The overcharging reaction is a heterogeneous electrochemical oxidation of the anion of the conductive salt, and it is reduced if the adsorption spaces available on the electrode are occupied by the gel-forming anion. The gel-forming anion is inert with respect to the overcharging reaction.

The reduction of overcharging reactions enables higher cell voltages. Electrode materials that are suitable for producing cells with a voltage up to 5 Volt, for example, are available. However, heretofore it has not been possible to make full use thereof, because no electrolyte that was stable at such high voltages was available.

The properties of the gel may be varied in a controlled manner by varying the quantities of $SO_2$, conductive salt, and gel-forming anion, relative to each other. If the quantity of gel-forming anion is increased, the resistance to deformation of the resulting gel is increased. A sufficiently high concentration results in an electrolyte with properties similar to a solid.

In order to produce a battery cell having the gel-like electrolyte according to the invention, the cell must be filled with the electrolyte and the required close contact with the electrodes, which often have microporous structures, must be provided. Various possible methods which fulfill these requirements are explained hereafter.

1. In Situ Production By Introducing A Fluoride Into the Cell

The fluoride is dissolved in a suitable solvent (for example water or acetonitrile), the solution is introduced into the cell, and the solvent is subsequently evaporated.

The cell is filled with sulphur dioxide gas to form the fluorosulphinate (reaction equation (I)). Excess $SO_2$ is allowed to escape.

The cell is filled with electrolyte solution. Depending on the fluoride used, the gel is not formed spontaneously. Additional measures may be required to promote gel formation. In particular, to this end a salt is used, the cation of which is exchanged with the cation of the added fluoride, as explained for exemplary purposes with reference to above reaction equations (Ia) and (IIa). In order to inhibit the production of solid LiCl according to reaction formula (II), it may be advantageous to use an electrolyte solution that has been enriched with aluminium chloride ($AlCl_3$).

2. Introduction of A Fluorosulphinate Prepared Beforehand

The fluorosulphinate is dissolved in a suitable solvent. In this contexts, an organic (proton-free) solvent should be used. The solution is introduced into the cell, and the solvent is subsequently evaporated.

The cell is then filled with normal electrolyte solution or an electrolyte solution enriched with aluminium chloride, as in the process of method 1, and time is allowed for the gel formation to take place.

3. Introduction of A Previously Prepared Fluorosulphinate Complex

A fluorosulphinate complex is dissolved in a suitable solvent, the solution is introduced into the cell, and the solvent is evaporated therefrom.

After the cell has been filled with electrolyte solution in a process similar to those described in methods 1 and 2, gel formation takes place spontaneously.

4. Direct Filling of Cells

Since the gel is thixotropic, it is possible to liquefy it by applying mechanical forces, for example by stirring, shaking, or by ultrasonic means, and to introduce the gel into the cell in the liquid state.

The starting components involved in the reactions described above can be prepared as follows:

a) Fluorosulphinate

The fluorosulphinate is formed by reacting the corresponding fluoride with sulphur dioxide. To this end, the reactants are for example mixed in an inert gas atmosphere and then stirred. After a reaction time that usually lasts from a few hours to several days, depending on the fluoride used and the reaction conditions, the unconverted $SO_2$ may be removed by evaporation and the resulting product may be used.

There are many known ways to produce the fluorosulfinate, in which $SO_2$ is used in various forms and states of aggregation. The method is only one example, which was described already in 1955 in:

F. Seel, L. Riehl "Über Fluorsulfinate", Z. Anorg. Allgem. Chem. 282, 293 (1955)

b) Fluorosulphinate Complex

The fluorosulphinate is mixed with
(i) an $SO_2$-based electrolyte, preferably with an $AlCl_3$ additive, or
(ii) liquid $SO_2$, preferably with an $AlCl_3$ additive.

The reaction takes place spontaneously. The excess $SO_2$ is evaporated off, and the resulting product can be used. In case (i), the conductive salt is eluted with liquid $SO_2$, and the product remains after the excess $SO_2$ has been removed. In case (ii), the excess $SO_2$ is evaporated off to obtain the product ready for use.

The positive properties of the gel electrolyte and the battery cells produced therewith will be explained hereafter with reference to experimental results, which are represented in FIGS. 1 to 5.

In order to investigate the properties of the gel electrolyte with respect to overcharging reactions, the electric current per unit area (current density) of a lithium cobalt oxide electrode was measured for various potentials. FIG. 1 shows the current density i in $mA/cm^2$ as a function of the electrode potential in Volt when a liquid electrolyte LE (triangular measurement points) and a gel electrolyte GE (square measurement points) are used respectively.

The figure shows clearly that, when the liquid electrolyte is used, the current density rises sharply after about 4.2 Volt, because the current is consumed by overcharging reactions and is converted into heat. In contrast, when the gel electrolyte according to the invention is used, the overcharging reaction is largely inhibited, the current remains low, and the amount of irreversibly consumed energy is small.

The property of the cells according to the invention which is discussed here, may be adjusted by varying the quantity of gel-forming anion according to the requirements of the individual case. If an overcharging reaction is advantageous for a given application, a relatively small quantity of fluorosulphinate is used to prepare the electrolyte. On the other hand, high concentrations of fluorosulphinate are advantageous if the cell voltage is to be as high as possible and—for example because the charging operation is controlled closely—an overcharging reaction is not necessary.

Figure 2:
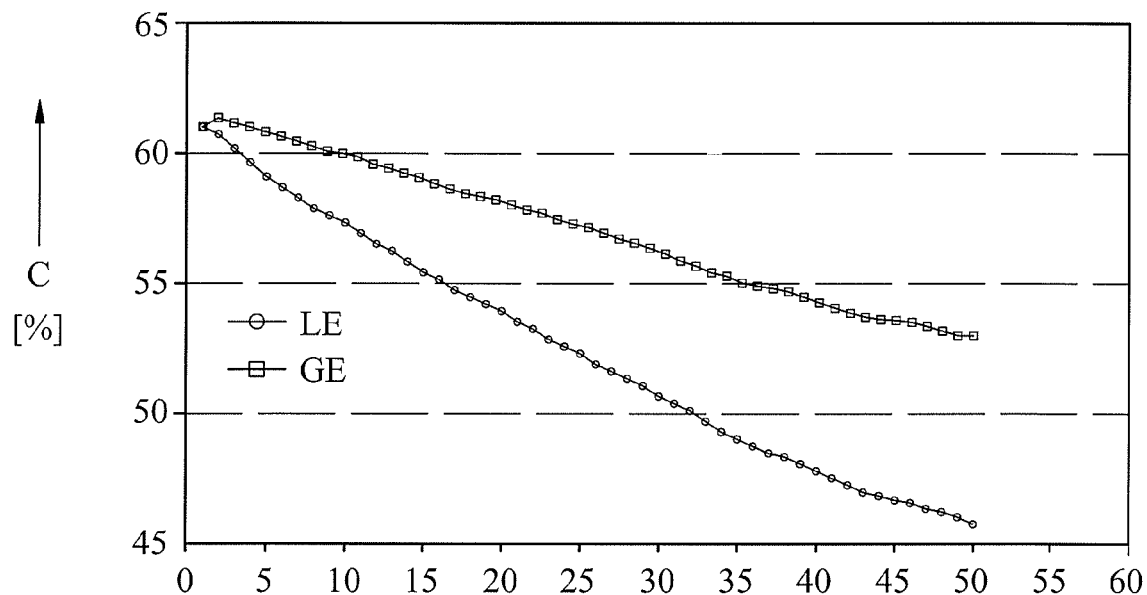

FIG. 2 shows the results of experiments in which the discharge capacity of lithium cobalt oxide electrodes was investigated as a function of the number of charging and discharging cycles. For this purpose, cyclic voltamograms were measured on a three-electrode system (working electrode: lithium cobalt oxide; counter electrode: lithium; reference electrode: lithium). The electrodes were positioned in a glass electrical cell and filled with the respective electrolyte solution to be investigated. The potential range of the cyclic voltamograms was between 3.5 Volt and 4.5 Volt, and was varied at a rate of 0.2 mV/s.

FIG. 2 shows the discharge capacities obtained in this manner as a percentage C of the theoretical capacity, and as a function of the number N of times the lithium cobalt oxide electrode was charged and discharged. In the same way as before a liquid electrolyte solution LE (circles) and a gel electrolyte solution GE (squares) are compared, the latter being prepared by the addition of lithium fluoride and other measures to promote gel formation. It is evident that the discharge capacity of the cell with the gel electrolyte is significantly higher, and more constant for the duration of the cycle programme, than with the liquid electrolyte. This can be attributed to the fact that less energy is consumed for overcharging reactions, without actual charging effect, when the gel electrolyte is used.

FIG. 3 again shows measurement results that were obtained from the cyclic voltammograms mentioned previously. This figure shows the peak position PP of the charge peak of the positive electrode in Volt for a liquid electrolyte LE (circles) and for a gel electrolyte GE (squares) as a function of the number of cycles N. Shifting of the peak to higher potentials is an indication that the resistance is increasing, this being caused by a covering layer on the positive electrode. The results show that such a shift is significantly less pronounced with the gel electrolyte than with the liquid electrolyte. This can be attributed to the fact that overcharging products required for formation of the covering layer are formed in smaller quantities when the gel is used.

Figure 3:
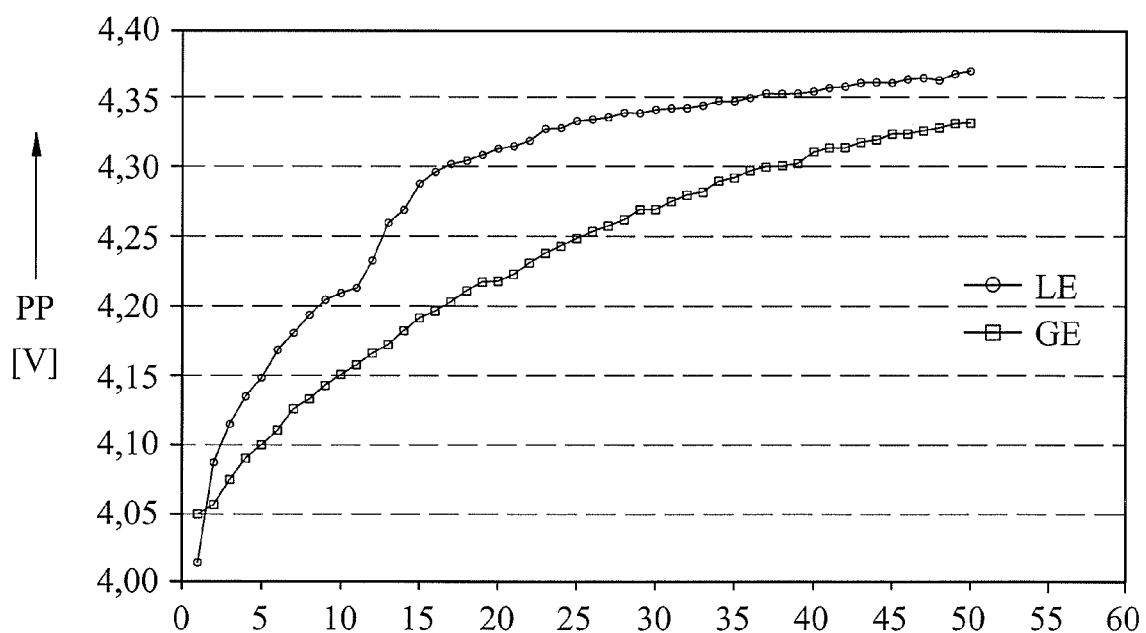
Figure 4:
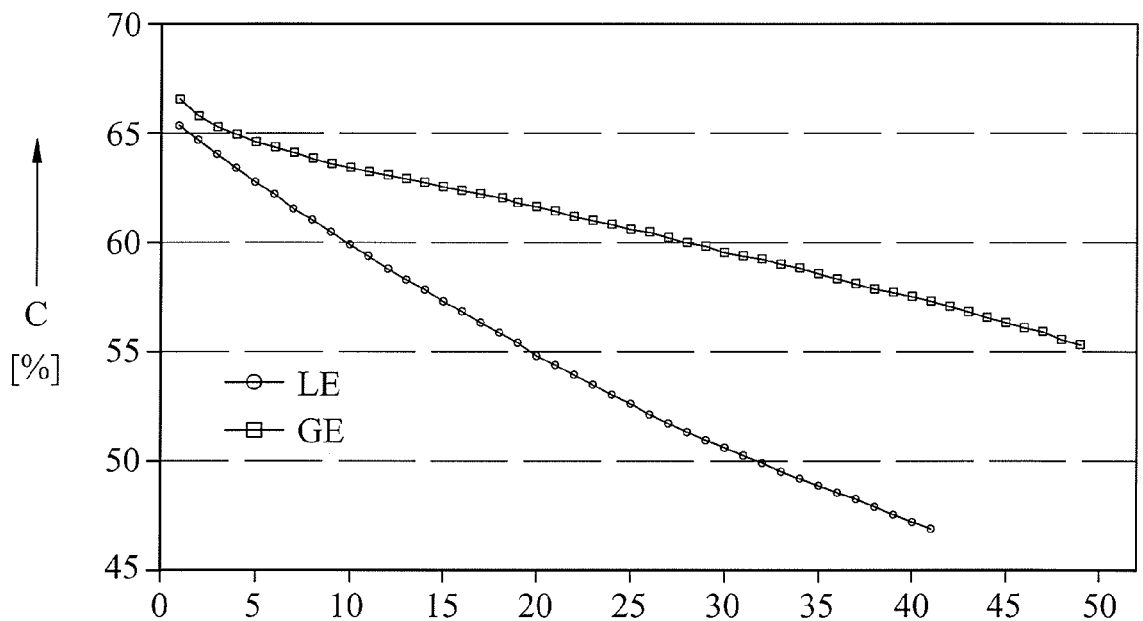
Figure 5:
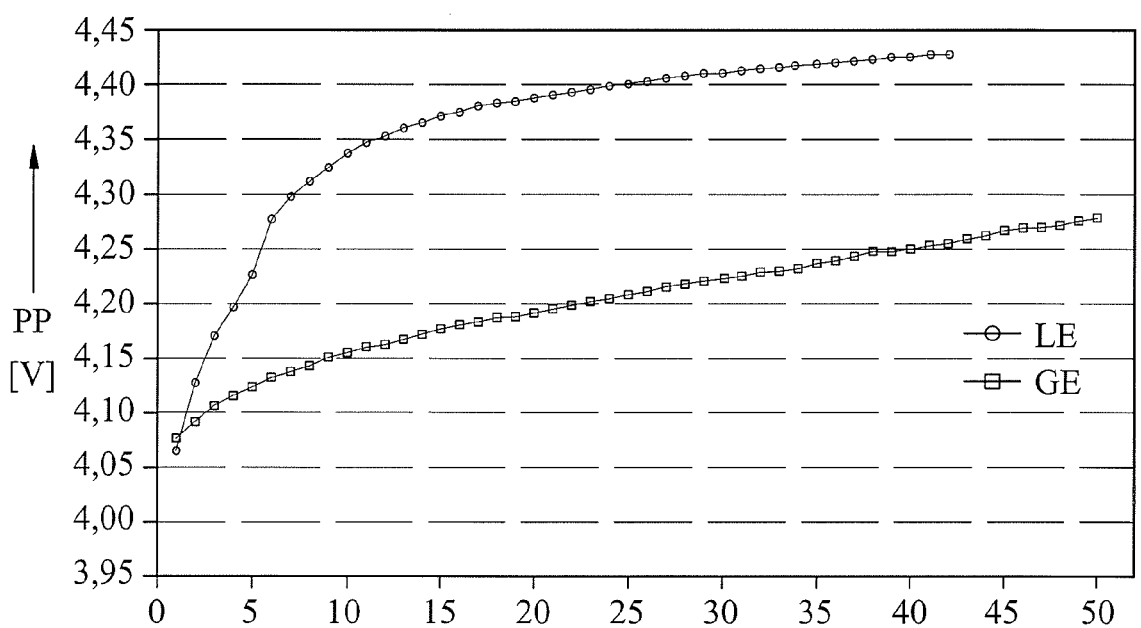

FIGS. 4 and 5 show experimental results similar to those of FIGS. 2 and 3, but in which the gel electrolyte was prepared using manganese fluoride ($MnF_3$). The results shown confirm the findings derived from FIGS. 2 and 3, indicating the advantageous effects of using a gel electrolyte.

The invention claimed is:

1. An electrolyte for an electrochemical battery cell comprising sulphur dioxide and a conductive salt, wherein said electrolyte is a gel that is formed with the involvement of a fluorosulphinate.

2. The electrolyte of claim 1, wherein the gel forming reaction includes a Lewis-base/Lewis-acid reaction between the fluorosulphinate and a Lewis acid.

3. The electrolyte of claim 1, wherein the electrolyte contains a metal halide MX, wherein
M is a metal from the third main group of the periodic system, and
X is one of the halogens fluorine, chlorine, bromine or iodine.

4. The electrolyte of claim 1, wherein the gel contains a solvate of the conductive salt with $SO_2$.

5. The electrolyte of claim 1, wherein the quantity of $SO_2$ relative to the quantity of conductive salt in the electrolyte is at least 0.1, preferably at least 0.5 mol $SO_2$ per mol conductive salt.

6. The electrolyte of claim 1, wherein the conductive salt is selected from the group consisting of aluminates, halides, oxalates, borates, phosphates, arsenates and gallates of an alkali metal, in particular of lithium.

7. An electrochemical battery cell comprising a positive electrode having an active mass, a negative electrode, and the electrolyte of claim 1.

8. The electrochemical battery cell according of claim 7, wherein the active mass of the positive electrode contains a metal compound, preferably a metal oxide.

9. The electrochemical battery cell of claim 8, wherein the active mass of the positive electrode contains a metal oxide of a transition metal M, in particular an element having an atomic number in the range from 22 to 28.

10. The electrochemical battery cell of claim 7, wherein the active mass of the positive electrode contains an intercalation compound.

11. The electrochemical battery cell of claim 7, wherein during charging of the cell an active metal is formed at the negative electrode by an electrode reaction, and the active metal is selected from alkali metals, alkaline earth metals, or metals of the second subgroup of the periodic system, the active metal being in particular lithium, sodium, calcium, zinc or aluminium.

12. A method for producing the electrochemical battery cell of claim 7, comprising the step of forming said gel inside the cell by reacting the fluorosulphinate with an electrolyte, the electrolyte containing $SO_2$ and a conductive salt.

13. A method for producing the electrochemical battery cell of claim 7, comprising the step of forming said gel outside the cell, converting said gel to a liquid state by applying mechanical forces, and introducing said electrolyte into the cell as a liquid.

* * * * *